United States Patent Office 2,839,048
Patented June 17, 1958

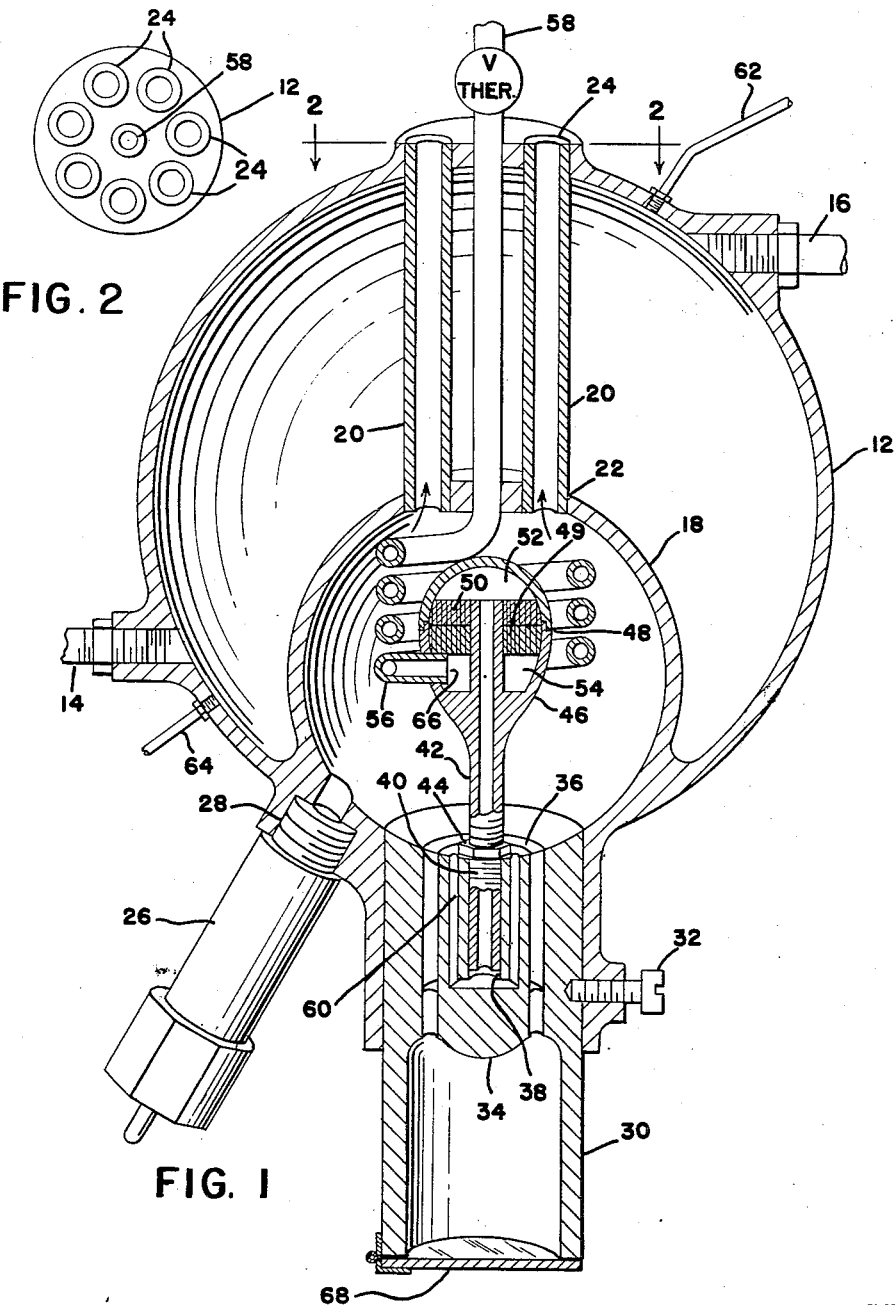

2,839,048

FLUID HEATER

Harold M. Jacklin, Jr., Kensington, Md.

Application September 8, 1952, Serial No. 310,940

3 Claims. (Cl. 126—350)

(Granted under Title 35, U. S. Code (1952), sec. 266)

The invention described herein may be manufactured and used by or for the Government of the United States of America for governmental purposes without the payment of any royalties thereon or therefor.

The present invention relates to a cold climate heat generator and more particularly to a boiler type of heater used for preheating internal combustion engines located in cold climates.

In the past, various means have been employed to solve the problem of starting internal combustion engines in cold climates, but none have been particularly successful. As a result, preheating of the engine coolant has been resorted to in an effort to transfer heat to the lubricating oil and moving parts, but this also has not been successful because of the lack of adequate heat generating means. The extremely low temperatures encountered are such that initiation of the combustion of fuel in the heat generator is very difficult and after such combustion has been achieved, the fuel burns at a very slow rate. Consequently, it takes an excessively long time to preheat the coolant to a proper temperature level. It is especially important in the case of military vehicles that this time period be reduced to a minimum so that they can be quickly started and put into operation immediately.

It is therefore an object of the invention to provide a heat generator which is capable of producing a maximum amount of heat within a minimum period of time.

It is a further object of the invention to provide a combustion chamber within a water chamber so that the large outer surface of the combustion chamber can impart heat to the fluid within the fluid shell.

It is a further object of the invention to pre-heat the fuel prior to its entering the combustion area so that the fuel prior to ignition appears in a gaseous form.

It is a further object of the invention to provide a catalyst in the fuel supply line which is also utilized for vaporizing the oil prior to its entry into the combustion area.

It is a still further object of the invention to provide a fluid distributing arrangement in the oil supply line between the catalyst and the combustion area.

With these and other objects in view, as will hereinafter more fully appear, and which will be more particularly pointed out in the appended claims, reference is now made to the following description taken in connection with the accompanying drawings in which:

Figure 1 is a vertical view in section showing the relationship of the parts to one another in the heat generator; and Figure 2 is a view taken on lines 2—2 of Figure 1.

The heat generator of this disclosure is adapted for use in cold climates, such as the arctic, where some type of engine preheating means is necessary to the successful operation of motor vehicles. The particular heat generating means of this invention heats an anti-freeze solution which is circulated from the generator through the water circulating passages of the engine, thus transferring heat to the oil and working parts of the engine to facilitate starting thereof. The heating is initiated by a cartridge starter and the fuel flow is secured by a thermostatic valve responsive to the temperature of the engine coolant.

Referring now to Figure 1, the heat generating means comprises an outer shell 12 made of a material of heat insulating properties, or the shell is preferably made of metal and suitably insulated in order to retain the heat within the outer shell. A water inlet 14 is fixed in the bottom portion of the shell and a hot water outlet 16 is situated adjacent the top section of the shell so that the coolant returning from an engine may be circulated through the inlet 14 and outlet 16 prior to being conducted to the engine for heating purposes.

An inner shell 18 of spherical shape is positioned within the outer shell and may be separate from the outer shell but secured to the lower portions thereof or the inner shell may be formed as an integral part of the outer shell, the latter and preferred form being shown in Figure 1. A plurality of corrosion resistant exhaust tubes 20 are secured at one end to the top portion of inner shell 18 and 22 and at their other end to the top portion 24 of outer shell 12, these tubes serving the purpose of conducting exhaust gases from the combustion chamber within inner shell 18, to the atmosphere.

A cartridge starter 26 is secured in the lower end of shell 12. This starter may be a suitable chemical heating capsule which supplies large amounts of heat at relatively high temperatures over varying periods of time. The initiation or starting of the capsule is initiated by any electrical or mechanical means, a percussion cap being commonly employed for this purpose. These heating units are available on the open market and are readily adaptable for use with the present invention.

An air supply tube 30 is fitted into an opening formed in the outer shell and is secured therein by means of bolts 32. Integrally formed within the inner portion of tube 30 is a central member 34 which provides air passageways 36 in tube 30. These air passageways 36 are circular, extend around the inner portion of tube 30 and are formed by the coaction of member 34 with the inner portions of tube 30. Member 34 is bored at 38 to receive a threaded shank 40 on shaft 42. Locknut 44 secures shaft 42 in the hollow bore. The shaft 42 flares outwardly to form a tear-drop shaped fuel and catalyst chamber 46. This chamber is formed by a covering cap which is adapted to mate with the lower portion of the chamber and is attached to the latter by means of screw threads or a slot arrangement 48. Positioned around the upper end of shaft 42 are catalyst members 49 and 50, the position of these members being such that there is formed a pair of fuel sections 52 and 54 in the fuel and catalyst chamber. The catalyst used in this invention is of a common type and is formed of a platinum screen or platinized asbestos for accelerating the decomposition of the fuel and thereby increasing the rate of vaporization and combustion of the fuel at lower ambient temperatures. The fuel supply inlet 58 enters from the top of the outer chamber, extends downwardly and terminates in a coil 56 within the spherical chamber 18 and surrounds the fuel and catalyst chamber 46. The fuel supply inlet 58 is attached to the outer shell and to the inner shell at the points where the inlet 58 passes therethrough. A vaporized fuel distributing arrangement is provided in the outer central portion of member 34 and comprises the lower shaft 38 and associated fuel passageway 60.

A thermostatic valve is positioned in the fuel supply inlet line and has its sensing element located either in the engine or in the water discharge pipes leading from the engine to the heat generator. When the engine coolant reaches a certain predetermined temperature the sensing element will actuate the thermostatic valve located in the fuel supply inlet 58 thereby shutting off fuel flow to the generator. This thermostatic valve is adapted to be operated between a full flow and zero flow position thus metering the amount of fuel which flows through the cracking coil prior to combustion in the spherical chamber. The valve is also adapted to be moved manually so as to positively shut off the flow of fuel through this inlet when desirable. A restriction 66 may be selectively incorporated in the extreme end of the fuel supply inlet, that is, the inlet which ties into the fuel and catalyst chamber 54.

The operation of the device is as follows:

When it is desired to heat the coolant of an engine, the extreme or outer ends of the conduits 14 and 16 are respectively attached to the water supply and return lines of the engine. At this time the engine will of course be cold and the thermostatic valve in the full open position thus providing a supply of fuel to the spherical combustion chamber. The cartridge starter is then energized or initiated to provide an intense amount of heat to the spherical combustion chamber 18. Immediately prior to the starting of the cartridge, fuel is allowed to flow through cracking coil 56 into the fuel and catalyst chamber 46. The path of the fuel thereafter is up through the catalyst into chamber 52 down through shaft 42 into the fuel distributing means located in the upper portion of central member 34. Fuel then flows through the fuel passageways 60 and into the lower portion of spherical chamber 18 where it is mixed with air flowing through inlet 30 to provide the proper ratio of fuel and air for combustion purposes. Exhaust gases are then discharged through exhaust tubes 20 to the atmosphere. As the fuel passes through cracking coil 56 it becomes vaporized and subsequent further vaporization of the oil is completed by the passage of a combination of gas and liquid fuel through catalyst 50. The resultant gaseous mixture then flows down through shaft 42 into the combustion chamber. An important feature of the instant disclosure is that complete vaporization of fuel is obtained prior to its introduction into the burning area.

After combustion has taken place for a short period of time the cartridge starter becomes exhausted and combustion will continue to occur in the combustion chamber because of the already present amount of sufficient heat to continue such combustion. This heat is transferred through the walls of the combustion chamber 18 to the fluid surrounding this chamber, and then transferred through outlet 16 to the circulating coolant passages of the engine being heated.

If desired an additional outlet 62 may be provided at the top of outer sphere 12 which will serve to conduct steam which will accumulate in the upper portion of the shell, to a heat exchanger located inside the vehicle body. The conduction of steam through this heat exchanger will serve to heat the area enclosed by the body for the comfort of those who will operate the vehicle and an appropriate steam and condensate return 64 is connected into the bottom of shell 12 for return to the heat generator. If desired, an air valve, such as that shown at 68 may be incorporated in the structure for controlling the amount of air flowing to the combustion chamber.

It is apparent that a reliable and practicable device has been conceived in solving the problem of preheating engines used in cold climates. The catalyst and cracking coil combination assures proper vaporization of the oil which is necessary for efficient combustion and consequent quick starting of the engine. The fuel distributing arrangement serves as a source of supply of vaporized fuel for combustion purposes. The overall combination of elements, coacting and cooperating with one another, produces a highly novel and practical structure with accompanying new results for the preheating of engines in cold climates.

Various modifications are contemplated and obviously will be resorted to by those skilled in the art without departing from the spirit and scope of the invention, as hereinafter defined by the appended claims, as only a preferred embodiment has been disclosed.

What is claimed is:

1. In combination, a cold climate heat generator comprising a first shell, a second shell in said first shell thereby providing a fluid space between said shells, fluid inlet and outlet connections in said first shell, a combustion chamber formed by the internal walls of said second shell, exhaust tubes extending from said combustion chamber in said second shell through said first shell to the atmosphere, a third shell having a fuel and catalyst chamber positioned in said combustion chamber, a cracking coil in said combustion chamber connected at one end to said fuel and catalyst chamber and adapted for connection at its other end to a source of fuel supply, means mounting said first and second shells on an air inlet tube, said air inlet tube having an air outlet opening into said combustion chamber, a cylindrical member supported in the outlet of said tube thereby forming air passageways between said member and the inner walls of said tube, a fuel passageway having the fuel inlet and outlet thereof formed in said cylindrical member, means mounting said third shell on said cylindrical member for providing communication between said fuel and catalyst chamber and said fuel inlet in said cylindrical member, and heating means in communication with said combustion chamber for initiating combustion of fuel, whereby the fuel is vaporized upon transiting said coil and fuel and catalyst chamber and is delivered to said fuel outlet in said cylindrical member where it mixes with incoming air for providing a combustible mixture in said combustion chamber.

2. The combination according to claim 1 wherein said first shell is provided with a steam outlet and a condensate return inlet, and a valve in the fuel inlet to said coil for controlling the supply of fuel to said combustion chamber.

3. The combination according to claim 1 wherein said third shell is positioned within said coil and includes a catalyst in said fuel and catalyst chamber.

References Cited in the file of this patent

UNITED STATES PATENTS

| | | |
|---|---|---|
| 993,665 | Elliott | May 30, 1911 |
| 1,239,775 | Detwiler | Sept. 11, 1917 |
| 1,261,463 | Wade | Apr. 2, 1918 |
| 1,703,447 | Held | Feb. 26, 1929 |
| 1,769,590 | Mauck | July 1, 1930 |
| 1,906,335 | Rathburn | May 2, 1933 |
| 2,074,168 | Danuser et al. | Mar. 16, 1937 |
| 2,259,010 | Taylor | Oct. 14, 1941 |
| 2,404,335 | Whittle | July 16, 1946 |
| 2,503,883 | Miller | Apr. 11, 1950 |
| 2,561,670 | Miller et al. | July 24, 1951 |
| 2,585,221 | Briskin | Feb. 12, 1952 |
| 2,625,138 | Jacoby | Jan. 13, 1953 |

FOREIGN PATENTS

| | | |
|---|---|---|
| 271,899 | Great Britain | Aug. 18, 1927 |